United States Patent Office 3,207,671
Patented Sept. 21, 1965

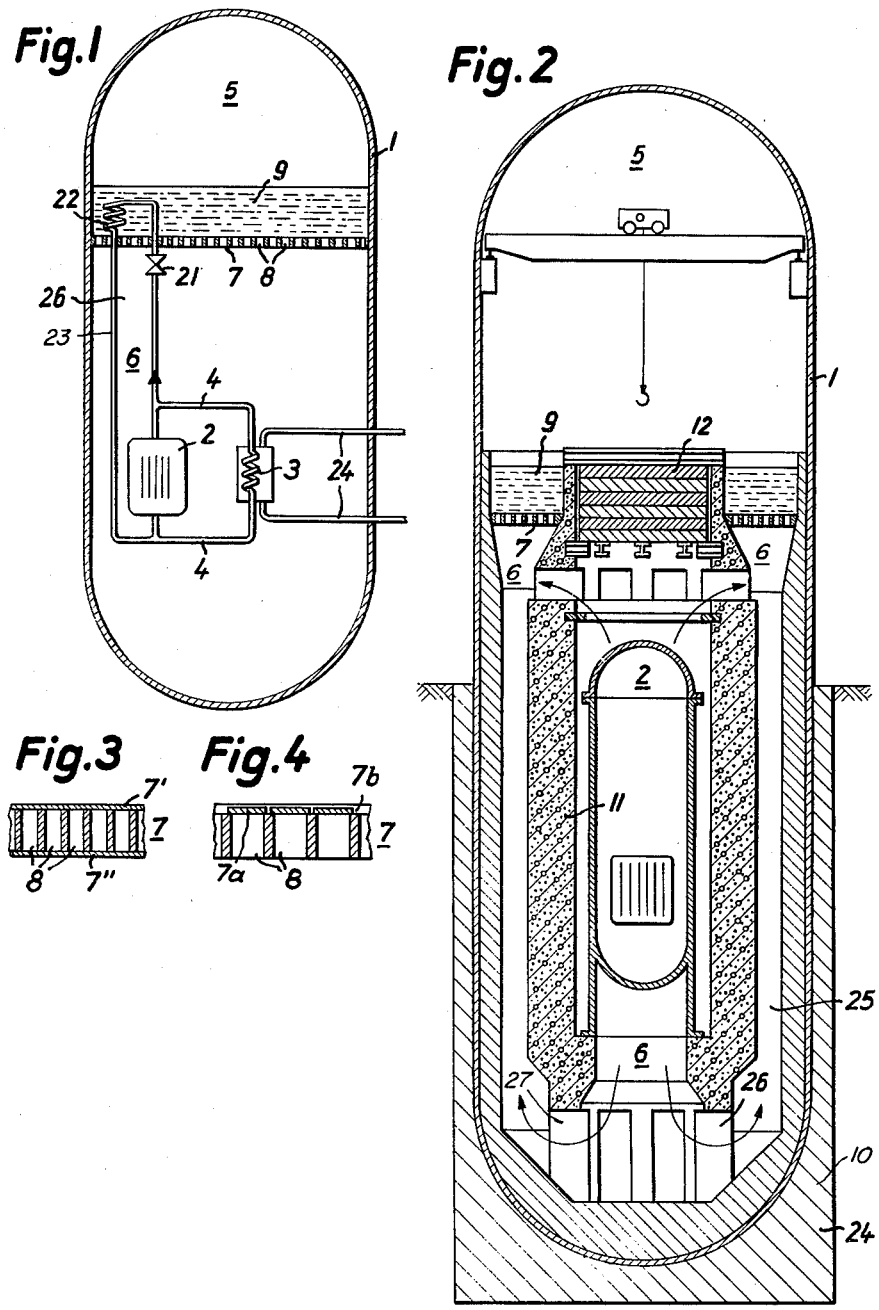

3,207,671
PRESSURE RELEASE DEVICE TO DRENCH
REACTOR CORE
Heinz Kornbichler, Walldorf, near Frankfurt am Main,
Germany, assignor to Licentia Patent-Verwaltungs-
G.m.b.H., Frankfurt am Main, Germany
Filed Nov. 22, 1960, Ser. No. 147,379
Claims priority, application Germany, Nov. 24, 1959,
L 34,773; Jan. 29, 1960, L 35,236
1 Claim. (Cl. 176—38)

The present invention is related to a safety structure or device for pressurized nuclear reactors. Nuclear reactors, particularly water cooled nuclear reactors, operating at a relatively high pressure level, are usually enclosed by a pressure casing. Such casing has sufficient strength so that in case of an explosion of the primary circuit of the cooling and heat exchange medium the casing can take up the excess pressure of the water vapor escaping from the exploded or leaking portion of that primary circuit.

There are a number of reasons why one is interested to construct a nuclear reactor system in a very compact way; i.e. one is interested in making the pressure casing system as small as possible. Naturally, in such a case of a compact design, the pressure which the casing might have to take up in an emergency case is the larger, the smaller such casing is designed. As a result, if one reduces the overall size of the pressure casing too much, the wall of the pressure casing has to be made thicker accordingly. Thus, in fact, one would not save construction cost in such compact design.

It has been suggested to install an emergency system which would take up some of the pressure of escaping water in case of an explosion in or of the reactor system; in such case one is enabled to dimension the pressure casings surrounding the reactor fairly small without necessitating an undue increase of the thickness of the wall of the casing. It has been suggested to use communicating pipes as emergency system which pipes are partially filled with cold water. The structure is so designed that the vapor escaping the exploded reactor or its cooling system has to pass through this communicating system. The most important difficulty, of course, is to be seen in that the water vapor will actually pass *through* the water column of the communicating system. However, it has been found that in case of an emergency, i.e. an explosion, the rapidly increasing pressure inside of the casing presses against and accelerates the water of the communicating system as a whole, until the water column therein is in the lowest possible position in the arm of the communicating system which is joined to the casing. Only thereafter the water vapor could pass upwardly through the water of the other arm. The disadvantage of this particular system is to be seen in that the acceleration of the water column as a whole in the communicating system requires too much time and that in the meantime the pressure in the casing has already been increased to such an extent that the casing will also explode. One has to consider at this point that the vapor escaping the exploded reactor pressure system will take for this escape only a few milli-seconds in the worst case. During this period of time, however, the water column of the communicating system has not been accelerated and no water vapor passes *through* this communicating system. Even if the casing is not exploded due to the rapidly increasing pressure, when finally the water vapor might escape through the communicating pipes, the pressure then is so high that it will pass so rapidly through the water column of the communicating system that there is no sufficient time for condensation.

It is primary object of the present invention to provide a new and improved safety construction for boiling water reactors which actually is effective with practically no delay at all in case of an emergency, thereby overcoming the deficiency of the system according to the prior art which latter system takes too much time to become really effective.

According to a primary feature of the present invention, it is suggested to have the vapor escaping from an exploded reactor portion pass through a water layer which water layer is separated from the reactor room by a perforated wall, the perforations thereof being closed during normal operation but may be opened in case the difference in pressure at the two sides of the wall exceeds a predetermined value.

The object of the invention and advantages thereof will be understood best from the detailed description of the drawings in which:

FIG. 1 is a schematic cross-section through a boiling water reactor, having a safety construction according to a first embodiment of the present invention;

FIG. 2 is a cross-section through a housing construction for a boiling reactor which differs in certain features from the construction shown in FIG. 1;

FIG. 3 shows a cross-section through a separating wall used in the devices of FIG. 1 and FIG. 2; and FIG. 4 is a modified cross-section of such wall shown in FIG. 3.

Turning now to the detailed description of the drawings, there is shown in FIG. 1 as well as FIG. 2 a reactor pressure casing 1 housing a boiling water reactor 2 and a heat exchanger 3 interconnected with the boiling water reactor 2 via conduit means 4 for the cooling medium whereby the primary circuit is defined. An auxiliary circuit for the circulating cooling-heat exchanger medium denoted with reference numeral 23 is provided for cooling in case of an emergency. This will be explained later. Ordinarily, this circuit is closed by means of valve 21.

Reference numeral 24 denotes the output circuit for the heat exchanger 3. The space 6 defined by casing 1 for housing reactor 2 and heat exchanger 3, is closed on its top by means of wall 7, a portion of which is shown in an enlarged cross-sectional view in the FIG. 3 or, alternatively, in FIG. 4. The wall 7 is a perforated one which has a large number of bores 8. These bores 8 are closed preferably on both of its sides by means of breakable, relatively thin covers such as denoted with 7' and 7", respectively.

FIG. 4 illustrates another way of closing the space 6 on its top. There are little plates 7a positioned above each bore, and a foil or layer 7b covers all these various discs closing the openings 8 and forming a coutinuous surface.

This wall 7 serves simultaneously as the bottom of a pool 9 of water on top thereof; above pool 9 is a space 5 defining the upper portion of the reactor arrangement and containing various objects necessary for operation of the reactor. The pool 9 also houses the emergency condenser 22 which is part of the emergency condensation circuit 23. The entrance of any vapor from the reactor 2 to this emergency condenser 22 is governed by valve 21 as stated above. In an emergency but without breakage of any part of the primary circuit, the pressure building up in this primary circuit opens the valve 21 and the vapor will pass into the condenser 22. The condensed water will drop down under the force of gravity and return thereby into the reactor 2. This condensator 2 thus provides for emergency condensation, for example, in case of a power failure for the heat exchange system.

The embodiment shown in FIG. 2 includes several of the elements shown in FIG. 1; in this embodiment is not shown an emergency condenser and the heat exchanger, for reasons of clarity. The reactor 2 is positioned inside of a pressure casing 1 embedded in a concrete casing 10 which is submerged underground. The pressure reactor is in itself additionally encased by concrete tubing 11, covered on the top thereof with a cover 12.

There are provided openings 26 and 27 which have the inner space of tubing 11 communicate with the lower portion 25 of casing 1. This lower portion 25 of casing 1 is again separated from the upper position 5 by means of a wall 7 having a similar basic construction as the wall 7 in FIG. 1; the only difference is, that the wall 7 in FIG. 2 is ring shaped; however, its cross-sectional configuration corresponds to that illustrated in FIGS. 3 and 4.

If for one reason or another, for example, in any of the embodiments shown, the boiling water reactor breaks, or, in the example shown in FIG. 1, the heat exchanger or any of the pipes or conduits break, then a considerable portion of the water present in the heat exchange circuit will vaporize, because there may be about 70 atmosphere pressure inside the heat exchange system. Thus, the space 6, surrounding immediately the reactor 2 is very fast under considerable pressure. The layers 7' and 7'' (FIG. 3) or the corresponding breaking discs (7a, 7b—FIG. 4) are so designated that they break and become penetrated if the pressure build up in the space surrounding reactor 2 exceeds a predetermined amount; or, in other words, if the pressure difference on both sides of the wall 7 exceeds, for example half an atmosphere. Upon such breaking, only relatively small areas of the wall 7 as defined by the walls surrounding the bores 8 remain. Through these bores 8, the water vapor now bubbles upwardly (in FIGS. 1 and 2) through the water layer 9. The water layer 9 as a whole thus defines a pressure buffer. The wall 7 itself does not offer considerable resistance to the vapor immersing from the exploded part, but the water layer 9 reduces the impact of any pressure shock wave.

In addition, the water layer 9 is relatively cool; when the water vapor passes therethrough, some of this vapor will condense and drop down; furthermore, the layer 9 will take up a portion of the heat content of the vapor. Thus, by virtue of the vapor passing through layer 9 its pressure will be reduced considerably. In the specific example shown in FIG. 2, the specific space 6 enclosed by the concrete casing 11 is separated from the space 5 by means of the ring shaped wall 7 and cover 12; the latter being rigidly secured to casing 11 for closing the upper part thereof. In the case of an explosion of the primary system of the reactor 2, the first shock of the first pressure wave is taken up by the concrete wall 11 and its cover 12. The escaping water vapor then penetrates the wall 7 which has been opened by the pressure and passes through the buffer water layer to the upper space 5.

It can be mentioned that a condenser for a particular emergency, such as condenser 22 in FIG. 1, can also be installed in the embodiment shown in FIG. 2. In this case, for example, the condenser pipes surround the cover 12 inside of the now ring-shaped pool 9.

The particular advantage of the device according to the invention is to be seen in that the vapor escaping from an exploded part of the reactor has not to remove a water column as a whole in conduits of communicating pipes, but, on the contrary, the vapor can bubble *immediately* through a water-buffer-layer without any delay. In the examples shown in FIGS. 1 and 2 this water layer is that of a pool positioned on top of the upper wall 7, having a more or less "porous" structure, but closing off the pool 9 from the reactor 2 in case of normal operation of the latter.

The invention is not limited to the embodiments disclosed above but modifications and changes thereof not constituting departments from the spirit and scope of the invention are intended to be covered by the following claim.

I claim:

Protective device for a boiling water nuclear reactor comprising a pressure system including a boiling water nuclear reactor, a heat exchanger and a primary circuit connecting said heat exchanger to said reactor for circulating the water; a casing housing said pressure system; a wall above said pressure system and dividing said casing horizontally during normal operation of said reactor; said wall being provided with a large number of openings covered to such an extent that they break if a predetermined pressure difference is built up between the two sides of said wall; and a water pool on top of said wall and having a free surface and an emergency condenser communicating with the pressure system of said reactor; said emergency condenser being disposed inside of said pool and an auxiliary circuit connecting the primary circuit with said condenser through a pressure relief valve.

References Cited by the Examiner

UNITED STATES PATENTS 3,022,238   2/62   Kolflat _____ 176—40

CARL D. QUARFORTH, *Primary Examiner.*